United States Patent [19]

Tsumura et al.

[11] 4,080,477

[45] Mar. 21, 1978

[54] PROCESSED CHEESE-LIKE PRODUCT CONTAINING SOY CHEESE

[75] Inventors: Haruo Tsumura, Osaka; Yukio Hashimoto, Izumiotsu, both of Japan

[73] Assignee: Fuji Oil Co., Ltd., Osaka, Japan

[21] Appl. No.: 626,299

[22] Filed: Oct. 28, 1975

Related U.S. Application Data

[63] Continuation-in-part of Ser. No. 407,568, Oct. 18, 1973, abandoned.

[30] Foreign Application Priority Data

Oct. 23, 1972 Japan .............................. 47-106407

[51] Int. Cl.² .......................... A23C 19/12; A23L 1/20
[52] U.S. Cl. ....................................... 426/656; 426/36; 426/46; 426/582; 426/657
[58] Field of Search .......................... 426/36; 46; 582; 426/656; 657

[56] References Cited

U.S. PATENT DOCUMENTS 3,743,516  7/1973  Lundstedt et al. ..................... 426/46

FOREIGN PATENT DOCUMENTS 1,284,331  8/1972  United Kingdom.

OTHER PUBLICATIONS

F. Kosikowski, "Cheese and Fermented Milk Foods", Edward Brothers Inc., Ann Arbor, Mich. pp. 299–303 (1966).

*Primary Examiner*—Raymond N. Jones
*Assistant Examiner*—R. A. Yoncoskie

[57] ABSTRACT

A processed cheese-like product containing soy cheese as a part of the major ingredient is made by adding both a casein-containing substance derived from animal milk and a cheese emulsifying melting salt to natural soy cheese and agitating this mixture under relatively high shearing conditions, while heating to an elevated temperature of less than about 85° C, for a period sufficient to form the mixture into a softened, flowable consistency. After pasteurization, the melted or softened mixture is introduced into a suitable container and cooled to produce a processed cheese-like product having superior flavor and texture characteristics.

11 Claims, No Drawings

4,080,477

PROCESSED CHEESE-LIKE PRODUCT CONTAINING SOY CHEESE

CROSS-REFERENCE TO RELATED APPLICATION

This application is a continuation-in-part of application Ser. No. 407,568, filed Oct. 18, 1973, now abandoned.

BACKGROUND OF THE INVENTION

This invention relates to processed cheese and, more particularly to a method for making a processed cheese-like product including soy cheese as a part of the major ingredient and the product made thereby.

In a typical process for making processed dairy cheese, one or more lots of natural dairy cheese are ground, melted and blended with various seasoning materials. The melted product is then extruded or otherwise introduced into forms of desired shape, cooled, and packaged for direct sale to the consumer. Several different kinds of natural cheeses can be mixed together and used as the raw material. Also, natural dairy cheeses of different ripeness and even cheeses having inferior texture and flavor can be used as the raw material. It is known that so-called melting salts, such as sodium phosphates, sodium citrate and sodium tartrate, can be added to the cheese to enhance melting.

In addition to being able to use otherwise unacceptable cheeses, processed dairy cheese has many other advantages, such as long shelf life because of the pasteurization during processing, a milk taste which is preferred for many uses, a flavor and texture that can be adjusted as desired by changing the type and proportions of dairy cheeses used, and a highly uniform quality.

Although many methods have been proposed for producing so-called soy cheese from soy protein, soy cheese has not become widely used. One of the primary draw backs to a more widespread use lies in the fact that natural soy cheeses are not readily adaptable as a raw material in conventional processes for making processed cheese. Therefore, the advantages associated with processed dairy cheeses have not heretofore been available to soy cheeses.

When heated to melting temperatures, natural soy cheeses tend to coagulate into a rubbery mass and, in some cases, the fats tend to separate therefrom. The melting salts used for natural dairy cheeses are not effective for eliminating these problems. When the melting salts are added to natural soy cheeses in amounts ordinarily used for making processed dairy cheeses, there is very little softening. Larger amounts of the melting salts only soften the natural soy cheeses to a consistency resembling cheese spread. Upon being packaged, such a softened product has a fragile texture and lacks good cohesiveness.

SUMMARY OF THE INVENTION

Accordingly, a primary object of this invention is to provide a method for making a processed cheese-like product including one or more soy cheeses as a part or the major ingredient.

Another object of this invention is to provide a processed cheese-like product containing one or more soy cheeses.

Other objects, aspects and advantages of the invention will become apparent to those skilled in the art upon reviewing the following detailed description and the appended claims.

It has been found that a processed cheese-like product can be prepared from natural soy cheeses, either aged or unaged, by adding both a casein-containing material and a conventional cheese-emulsifying melting salt to the soy cheese curd and then mixing or agitating this mixture under relative high shearing conditions while heating to a temperature of about 50° to about 85° C. Instead of coagulating into a rubbery mass, the soy cheese is formed, along with the other ingredients, into a melted or softened homogeneous mass having a flowable consistency permitting it to be conveniently packaged. Upon cooling, the processed product has body and texture characteristics resembling those of processed dairy cheeses.

As in processes for preparing processed dairy cheeses, suitable amounts of water, neutralizing agents, coloring additives and/or preservatives can be mixed with the soy cheese. Edible oils or fats also can be added as an extender if desired.

DESCRIPTION OF THE PREFERRED EMBODIMENTS

As used herein, the term "processed cheese-like product" means a product which has a relatively firm body, good cohesiveness and texture characteristics making it capable of being sliced as distinguished from a very soft product having a fragile texture, poor cohesiveness and the consistency of a spread.

The natural soy cheeses used in the invention can be any conventional soy cheese which has a protein content substantially made up of soy protein and preferably is formed by fermentation of soy milk with a lactic acid cheese starter culture and forming a curd from the fermented broth with conventional soy cheese coagulating agents including alkaline earth metal salts, such as calcium sulfate, magnesium sulfate, magnesium chloride, calcium chloride, etc., sugar acid lactone, such as gluconic-delta-lactone and uronic acid lactones, and organic acids, such as acetic acid, lactic acid and citric acid. Representative examples of suitable natural soy cheeses are described in FOOD TECHNOLOGY, Volume 21, pp. 95–5 (July, 1967).

As in processes for preparing processed diary cheeses, natural soy cheeses from two or more different lots can be mixed together to provide a more mellowed flavor. For example, a natural soy cheese which is slightly over-ripened, i.e., has a Nitrogen Soluble Index (NSI) greater than 30, and a natural soy cheese which is slightly under-ripened, i.e., has a NSI less than 30, can be mixed together, preferably in proper proportions to provide a mixture of natural soy cheeses having an overall NSI of about 30. This mixture, upon being processed in accordance with the process of the invention, produces a processed cheese-like product having a suitable flavor and texture characteristics.

When a processed product having a very bland flavor is desired, the overall NSI of the natural soy cheese used as the starting material can be lower than 30. For example, very young natural soy cheese and even "green" natural soy cheese, i.e., uncured soy cheese curd, can be used. Less ripened and "green" soy cheese curd usually are more difficult to form into a suitably melted or softened mass during the mixing or agitating step. Therefore, when either of these are used as a starting material, the device used for performing the mixing or agitating step should be capable of imparting higher shearing forces on the mixture than is normally necessary when more aged or ripened soy cheeses are used. For example, conventional high speed rotary cutters, colloid mills, calendars or homogenizers, including means for imparting a relative high shearing force on the mixture, can be used.

The casein-containing material used in this invention contains casein derived from animal milk and is suitable for human consumption. The preferred casein-containing materials are caseinates, such as sodium caseinate and calcium caseinate, dairy cheese, dairy cheese curd, whole milk solids, skim milk solids, and mixtures thereof, with sodium caseinate being the most preferred. As used herein, the term "dairy cheese" denotes cheeses produced from natural milk fractions.

The amount of casein-containing material mixed with the natural soy cheese varies depending upon the particular casein-containing material used. In any case, at least one part by weight of the casein-containing material as casein per 100 parts by weight of natural soy cheese is added. When a casein-containing material, other than dairy cheese or dairy cheese curd is used, the amount added is preferably within the range of 1 to about 10 parts by weight as casein per 100 parts by weight of natural soy cheese. Amounts of these casein-containing materials less than about 1 part generally are not effective of producing a satisfactory melting of natural soy cheese, while amounts in excess of about 10 parts tend to cause fat separation, produce an unsmooth, gummy curd during melting and impart an undesirable flavor to the resultant product unless water and an edible fat or oil is included in the starting mixture as explained below. Since dairy cheeses already are in curd form and can be processed without coagulating into a rubbery mass, larger amounts of same can be used even though it is used as the sole casein-containing substance.

Water and/or an edible fat or oil, such as hydrogenated soybean oil, palm oil, hydrogenated cotton seed oil and beef tallow, can be advantageously admixed with the soy cheese and other ingredients to economically increase the quantity of product produced. Amounts of water up to about 60 weight % of the mixture can be used. Higher amounts tend to adversely affect the body and texture characteristics of the resultant product. When water and an edible fat or oil are used, it has been found that amounts of casein-containing materials (other than dairy cheese or dairy cheese curd) higher than mentioned above can be used by regulating the amounts of total crude protein in the soy cheese and the casein-containing material. That is, the amount of the casein-containing material in the mixture can be increased up to about 50 parts as casein by weight per 100 parts of soy cheese, preferably to about 10 to about 30 parts as casein per 100 parts of soy cheese, so long as the total crude protein content of both the soy cheese and the casein-containing material is within the range of about 10 to about 30 weight %, the water content is within the range of about 40 to about 55 weight %, and the edible fat or oil content is within the range of about 12 to about 35 weight %, all based on the total weight of the mixture. The preferred ranges for the total crude protein, water and edible fat or oil are about 20 to about 25 weight %, about 45 to about 50 weight % and about 20 to about 30 weight %, respectively. Even in this case, it is advantageous not to use an amount of casein-containing material in excess of about 50 parts as casein by weight per 100 parts of soy cheese. Otherwise, the final product will not fully exhibit the flavor developed in the soy cheese by lactic acid fermentation and aging.

The melting salts used in this invention can be any of the so-called cheese emulsifying agents used in preparing processed dairy cheese. The preferred melting salts are selected from the group consisting of sodium phosphates, such as disodium phosphate and trisodium phosphate; sodium pyrophosphates, such as sodium acid pyrophosphate, and tetrasodium pyrophosphate; sodium polyphosphates; sodium metaphosphates, such as sodium hexametaphosphate; sodium citrate; sodium tartrate; dipotassium phosphate; potassium citrate; calcium citrate; sodium potassium tartrate; and mixtures thereof, with sodium polyphosphates, sodium metaphosphates, sodium citrate and mixtures thereof being the most preferred. The amount of melting salts used depends primarily on the ripeness and quality of the natural soy cheese and the quantity of casein-containing material used, with larger amounts being used when the soy cheese is young. Generally, the amount of melting salt used is from about 1 to about 5 weight %, preferably from about 1 to about 3 weight %, based on the total weight of the natural soy cheese and the casein-containing material as casein.

As mentioned above, the use of a melting salt alone will not provide satisfactory melting of natural soy cheeses. Increasing the amount of the melting salt used to levels substantially above that normally used in processing natural dairy cheese, e.g., about 2 to about 3 weight %, provides some softening. However, rather than melting into a softened, homogeneous mass having flowable consistency suitable for making an acceptable processed product upon being heated, the softened soy cheese has a consistency resembling a cheese spread. With such a consistency, the resultant processed product has a fragile texture and lacks a suitable cohesiveness. On the other hand, the addition of a casein-containing material alone has little or no effect on the ability of natural soy cheese to melt satisfactorily. To obtain satisfactory melting of the soy cheese for the production of an acceptable processed product, both additives must be used and the mixture must be mixed or agitated by subjecting it to relatively high shearing action while being heated to a temperature within the range of about 50° to about 85° C.

The natural soy cheese, and the dairy cheese (if used as the casein-containing material), is first ground up in a suitable manner if not already in curd form. The particle size of the ground cheese is not particularly critical so long as the particles are small enough to facilitate homogeneous dispersion of the additives (and the different cheeses when more than one lot or types of cheese are used) and to facilitate melting within a reasonably short time period during the mixing or agitating step.

During the mixing or agitating step, the ground soy cheese, the casein-containing material and the melting salt (and water and an edible fat or oil if used) are mixed and agitated with a shearing action and at an elevated temperature under conditions sufficient to form the mixture into a melted or softened homogeneous mass having a substantially flowable consistency. It is not fully understood why this shearing action at an elevated temperature causes a melting or softening of the soy cheese. However, it is presently believed that the simultaneous shearing action and heating causes a breakdown or partial degradation of at least some of the bonds between the functional groups of the protein in both the soy cheese and the casein-containing material. The exposed functional groups apparently have an increased affinity for the other ingredients of the mixture, thereby enhancing the emulsifying effect and permitting the soy cheese to melt in a manner to produce a product having a good texture, i.e., reasonably rigid body (non-fragile) and good cohesiveness and smoothness. This is quite surprising because, when a relatively high shearing action is used for processing conventional dairy cheeses, the product tends to have a short texture and usually is not suitable for slicing or use as a block type processed cheese.

The mixture should be heated to a minimum temperature of about 50° C during the agitating step in order to obtain the desired melting or softening of the soy cheese. Temperatures in excess of about 85° C should be avoided in order to prevent separation and/or decomposition of the fat in the soy cheese and to prevent denaturation of protein.

Representative examples of commercially available shearing devices which can be used for performing the agitating step include a Stephan Silent Cutter, marketed by A. Stephan and Sohne, Western Germany, a T. K. Microider Chopper Colloid Mill, marketed by Tokushu Kika Industries, Osaka, Japan, and a Universal Homogenizer, marketed by Nippon Seiko Seisakusho, Tokyo, Japan.

The temperature to which the mixture is heated during the agitating step is not particularly critical, i.e., can be considerably less than 85° C, so long as the soy cheese is melted or softened to a flowable consistency. For example, the agitating step can be carried out in a conventional homogenizer having a shearing means and operating at about 6000 R.P.M., with external heating, for a period of about 10 to 40 minutes. However, in a preferred embodiment, the temperature of the mixture is elevated to a temperature of about 80° to about 85° C during the agitating step so that the soy cheese is both melted or softened to a flowable consistency and is pasteurized.

Because of the high solids content of the mixture, it can be heated to the desired elevated temperature during the agitating step solely by frictional heat supplied by the shearing device without external heating. For example, the agitating step can be carried out in a conventional Stephan food cutter operating at about 3000 R.P.M. for about 10 to about 40 minutes and the temperature of the mixture can be increased to about 60° to 70° without external heating.

As in conventional processes for preparing processed dairy cheeses, suitable amounts of neutralizing agents, such as sodium carbonate, coloring additives, and/or preservatives can be mixed with the soy cheese, either prior to or after the agitating step.

If the temperature to which the mixture is heated during the agitation step is not high enough for pasteurization, the melted or softened mixture is introduced into a suitable heating vessel, such as a conventional steam injected pasteurizing kettle including means for stirring, wherein it is heated to a temperature below about 85° C, e.g., 80° to 85° C, for a sufficient time to obtain pasteurization, e.g., about 10 to about 15 minutes.

The melted or softened, pasteurized mixture is then introduced into forms, container or packages in the usual manner for preparing processed dairy cheeses and cooled to about 5°-10° C to obtain a processed cheese-like product. If desired, the melted or softened mixture containing soy cheese can be blended with a melted dairy cheese before packaging and cooling.

Without further elaboration, it is believed those skilled in the art can, using the above description, practice the invention to its fullest extent. The following examples are presented to illustrate the invention and should not be construed as limitative of the remainder of the specification and the claims in any manner whatsoever.

EXAMPLE 1

A quantity of soy cheese was prepared by adding 3% of a partially hydrogenated palm oil, 2% of lactose, and a cheese flavoring to a soy milk extracted from defatted soy bean protein, fermenting this mixture with a lactic acid cheese starter culture, and coagulating the fermented broth with about 0.3% calcium sulfate to form a curd. One sample (A) of the soy cheese curd was aged for about 12 weeks (NSI=39, pH=5.6 and moisture content=59%) and another sample (B) of the soy cheese curd was aged for 6 weeks (NSI=17.5, pH=5.25 and moisture content=60%). 100 parts of sample A and 50 parts of sample B were ground and mixed together and 5 parts of sodium caseinate and 5 parts of sodium tripolyphosphate were added thereto. This mixture was introduced into a Universal Homogenizer (marketed by Nippon Seiki Seisakusho, Tokyo, Japan), set at 6000 R.P.M. and surrounded by a water bath maintained at 70° C, wherein it was subjected to a shearing action for 30 minutes. The resultant softened mixture was thereafter pasteurized by heating to a temperature of 80°-85° C and stirring for 15 minutes in a pasteurization kettle. The softened, pasteurized mixture having a flowable consistency was then packaged and cooled to about 5° C. The thus-produced processed cheese-like product had the following analysis: NSI=30.9, pH =6.1 and moisture content=58%, and had a mild flavor, a non-fragile texture resembling processed dairy cheese and a superior keeping quality.

As a control, a mixture of the ground soy cheese samples was processed in the same manner except the sodium caseinate was not added to the mixture before introduction into the homogenizer, i.e., before the shearing step. During the shearing step, the soy cheeses were only slightly softened instead of being formed into a flowable consistency. The softened mixture was forced into a package and cooled. The resultant product had a pH of 6.05 and a very coarse, non-uniform texture.

In another control, a mixture of the ground soy cheese samples was processed in the same manner except neither the sodium caseinate nor the tripolyphosphate melting salt was added to the mixture before the shearing and heating step. During this step, the mixture coagulated into a rubbery mass and could not be further processed.

EXAMPLE 2

100 Parts of a soy cheese sample A prepared in Example 1 and 25 parts of Edam cheese were ground individually and mixed together. 3.7 parts of sodium caseinate and 4 parts of a polyphosphoric acid melting salt (Takeda 4A, marketed by Takeda Chemical Industries Ltd. Osaka, Japan and consisting of about 35 wt. % sodium polyphosphate, about 15 wt. % sodium metaphosphate, about 45 wt. % sodium pyrophosphate and about 5 wt. % dibasic sodium phosphate) were added to the mixture. The resultant mixture was thereafter processed in the same manner as described in Example 1.

The resultant cheese-like product had a pH of 6.25, a moisture content of 54.5% and texture and flavor characteristics suitable for a processed chesse product.

EXAMPLE 3

Soy cheese was prepared by adding 3% of a synthetic fat composition having properties resembling milk fat, an interesterified product of natural fats having a short chain fatty acids composition (i.e., $C_4$, $C_6$, $C_8$, and $C_{10}$ fatty acids) similar to milk fat, and 2% of glucose to a soy milk prepared from defatted soybean protein, fermenting the mixture with a lactic acid cheese starter culture, coagulating the fermented broth with 0.2% of glucono-delta-lactone to form a curd, and aging the curd for 10 weeks. 100 Parts of the thus-produced soy cheese (NSI=28.4, pH=5.3 and moisture content=57.2%) and 100 parts Gouda cheese were ground and mixed together, and 6 parts of a sodium tripolyphosphate melting salt and 2 parts of a neutralizing agent (sodium carbonate) were added to the cheese mixture. The resultant mixture was introduced into a Stephan Silent Cutter wherein it was subjected to a shearing action at a temperature of 80° C for 20 minutes. The resultant softened and pasteurized material was then packaged and cooled and a highly satisfactory processed cheese-like product was obtained.

EXAMPLE 4

100 Parts of soy cheese sample A prepared in Example 1 and aged for 7 months was ground and introduced, along with 7 parts of sodium caseinate, 0.5 parts of a neutralizing agent, 1 part of sodium citrate and 15 parts of water into a Stephan Silent Cutter wherein the mixture was subjected to a shearing action for about 80 minutes. During this mixing and shearing step, the temperature of the mixture rapidly increased to about 60°-70° C. The resultant mixture was thereafter heated in a pasteurizing kettle with a stirring, at a temperature of about 80° C and a pressure of about 25 mm Hg, for 20 minutes. The melted, pasteurized mixture was packaged and cooled in the same manner as in Example 1 and a satisfactory processed cheese-like product was obtained. Thus, it can be seen that a casein-containing substance and smaller amount of the melting salt can provide satisfactory melting of soy cheese when a high speed shearing device is used.

EXAMPLE 5

100 Parts of the green soy cheese curd prepared in Example 1, which was not aged and had a NSI of 4, were cut into small particles and mixed with 4 parts of sodium caseinate, 2 parts of sodium hexametaphosphate, and 0.4 parts of sodium carbonate at a temperature of 60° C in a high speed shearing device (T.K. Microider). The mixture was thereafter pasteurized in a pasteurization vessel heated to a temperature of 85° C. After pasteurization, a small amount of coloring material and flavoring material were mixed into the melted mixture. The mixture was then packaged and cooled to 5° C and a processed soy cheese product having a bland flavor free from unfavorable beany odor and very good texture was obtained.

EXAMPLE 6

100 Parts of natural soy cheese prepared in Example 1 and aged for 10 weeks were ground and admixed with 20 parts of sodium caseinate, 18 parts of hardened (hydrogenated) soy bean oil (melting point = 32° C), 40 parts of warm water, 0.8 parts of sodium polyphosphate, 0.2 parts of sodium metaphosphate, 1 part of sodium pyrophosphate and 0.2 parts of sodium carbonate. This mixture was introduced into a Stephan Silent Cutter and agitated therein under shear for 20 minutes, during which time the temperature of the mixture increased to 60°-70° C. 0.2 parts of sodium chloride was added to the melted or softened mixture and it was further mixed in the Stephan Silent Cutter for 5 more minutes. The resultant mixture was pasteurized in a conventional pasteurizing kettle at a temperature of 80° C, deaerated, introduced into packages and cooled.

The resultant processed cheese-like product had the following composition: crude protein = 21 wt. %, water content = 50 wt. % and oil and fat content = 23%.

The results from the above examples show that natural soy cheeses cannot be made into a satisfactory processed cheese-like product having a non-fragile, cohesive texture resembling processed dairy cheese, unless both a casein-containing substance, such as sodium caseinate or a dairy cheese, and a melting salt, such as sodium tripolyphosphate, polyphosphoric acid, sodium citrate, and sodium hexametaphosphate, are added to the soy cheese prior to melting at an elevated temperature below about 85° C in a device capable of imparting a relatively high shearing action thereto.

From the foregoing description, those skilled in the art can easily ascertain the essential characteristics of the invention and, without departing from the spirit of the scope thereof, can make various changes and modifications of the invention to adapt it to various usages and conditions.

We claim:

1. A method for preparing a firm, sliceable, processed cheese-like product containing no more than about 60 weight % moisture from soy cheese comprising the steps of:
    (A) admixing particulate natural soy cheese with a casein-containing material selected from the group consisting of sodium caseinate, calcium caseinate, dairy cheese, dairy cheese curd, whole milk solids, skim milk solids and mixtures thereof and a cheese emulsifying melting salt used in dairy cheese processing, the amount of said casein-containing material being at least about 1 part as casein by weight per 100 parts of said soy cheese and the amount of said melting salt being within the range of about 1 to about 5 weight %, based on the total weight of said soy cheese and said casein-containing material;
    (B) agitating the resulting mixture under high shearing conditions while at a temperature of about 50° to about 85° C for a period of time sufficient to convert the mixture to a softened, flowable consistency;
    (C) introducing the softened mixture into a container; and
    (D) cooling to form a firm, sliceable processed cheese-like product.

2. The method according to claim 1 wherein said casein-containing material is a sodium or calcium caseinate and the amount thereof is within the range of about 1 to about 10 parts by weight as casein per 100 parts by weight of said natural soy cheese.

3. A method according to claim 2 wherein said casein-containing material is sodium caseinate.

4. A method according to claim 1 wherein said melting salt is selected from the group consisting of sodium phosphates, sodium pyrophosphates, sodium polyphosphates, sodium metaphosphates, sodium citrate, sodium tartrate, dipotassium phosphate, potassium citrate, calcium citrate, sodium potassium tartrate, and mixture thereof.

5. A method according to claim 4 wherein said melting salt is selected from the group consisting of sodium polyphosphates, sodium metaphosphates, sodium citrate, and mixtures thereof.

6. A method according to claim 1 wherein the overall Nitrogen Soluble Index of said natural soy cheese is about 30.

7. A method according to claim 1 wherein said step (B) is carried out at a temperature of about 80° to about 85° C for about 10 to about 40 minutes.

8. The product produced by the method of claim 1.

9. A method according to claim 1 wherein water and an edible fat or oil is admixed with said natural soy cheese during said step (A), the amount of said casein-containing material being within the range of about 1 to 50 parts as casein per 100 parts of soy cheese; the total combined protein content of said soy cheese and said casein-containing material, the amount of water and the amount of said fat or oil being within the respective ranges of about 10 to about 30 weight %, about 40 to about 55 weight % and about 12 to about 35 weight %, all based on the total weight of said mixture.

10. A method according to claim 9 wherein the amount of said casein-containing material is within the range of about 10 to about 30 parts as casein per 100 parts of soy cheese and the amounts of said protein, water and fat or oil are within the respective ranges of about 20 to about 25 weight %, about 45 to about 50 weight % and about 20 to 30 weight %, based on the total weight of said mixture.

11. The product prepared by the method of claim 9.

* * * * *